United States Patent Office
3,627,498
Patented Dec. 14, 1971

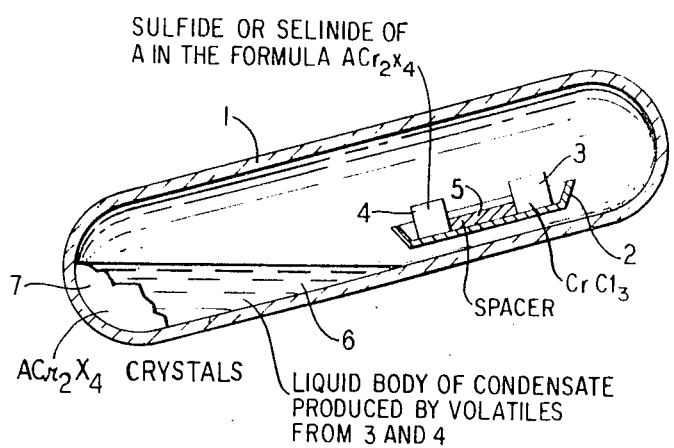

3,627,498
GROWTH OF CRYSTALLINE CHALCOGENIDE SPINELS
Larry K. Shick, Plainfield, and Allyn R. Von Neida, Summit, N.J., assignors to Bell Telephone Laboratories, Incorporated, Murray Hill, N.J.
Filed Sept. 30, 1968, Ser. No. 763,627
Int. Cl. B01j 17/32
U.S. Cl. 23—294
6 Claims

ABSTRACT OF THE DISCLOSURE

Crystalline chalcogenide spinels of the stoichiometry $ACr_2Se_4$, where A is zinc or cadmium, and $A'Cr_2S_4$, where A' is zinc, cadmium, cobalt, manganese, iron, copper or nickel, are grown within a sealed container at temperatures above those expected to result in decomposition of the product. Crystalline growth appears within a body of liquid produced by vapor condensation.

BACKGROUND OF THE INVENTION

(1) Field of the invention

The invention is concerned with the growth of crystalline $CdCr_2Se_4$ and related chalcogenide spinels. Such compositions are under study by a number of workers both here and abroad by reason of magnetic, optical and semiconducting properties. Classes of device uses include those in which optical transmission properties and/or semiconductor properties are varied by application of a magnetic field.

(2) Description of the prior art

Vol. 15 of Physical Review Letters, p. 493 for 1965, contains a disclosure of a ferromagnetic spinel material which at once stimulated widespread interest in a variety of fields. That, and subsequent work, revealed $CdCr_2Se_4$ and related materials to be domain magnetic (ferromagnetic, ferrimagnetic and/or antiferromagnetic, depending on temperature and composition) and semiconducting (materials ordinarily p-type as made may be doped with various compensating impurities). Related properties, such as the dependence of semiconductor properties on applied fields and magneto-optic effects, have been of particular device interest.

As is so often the case, an investigation of such properties has been seriously hindered by the general unavailability of large crystalline sections of requisite perfection.

Initial materials were polycrystalline, but reported experimental results were soon based on crystals generally prepared by what most workers considered to be solid-solid interaction. Probably the most successful of these procedures was that reported in vol. 38, Journal of Applied Physics, p. 965 (1967). This procedure uses chromium trichloride together with the appropriate sulfide or selenide. Crystals produced are typically small fractions of a millimeter in major dimension.

Probably the small crystal product resulting from such solid-solid interactions is typical of such procedures, and significant increase in resulting crystal dimension is not to be expected. Attempts to grow crystals by other techniques have apparently been unsuccessful. Use of many alternate procedures has never seemed promising based on the presumption that growth temperatures could not exceed the known decomposition temperature of the crystalline product. Since $CdCr_2Se_4$, for example, decomposes at a fairly rapid rate at about 700° C. and based on the very low vapor pressures of feasible starting ingredients at such temperature, vapor growth seemed to be precluded.

SUMMARY OF THE INVENTION

Crystals of the chalcogenide spinels $ACr_2Se_4$, in which A is at least one element of the group consisting of zinc and cadmium, and $A'Cr_2S_4$, in which A' is at least one element of the group consisting of zinc, cadmium, cobalt, manganese, iron, copper and nickel, are grown at temperatures far in excess of the presumed decomposition temperature. Growth appears to involve all three phases— solid, liquid and vapor—and results, when starting ingredients are heated, so as to produce a vapor which is condensed at a somewhat lower temperature to produce a liquid phase from which crystalline material apparently precipitates. To avoid solid-solid reaction and to assure maximum product, the initial ingredients, $CrCl_3$ and ASe and/or A'S where A and A' are as defined above, are spaced one from the other. Growth ordinarily is carried out in a sealed vessel which has been evacuated to a convenient pressure obtainable by use of a mechanical pump. Condensation occurs at a temperature below that to which the reactants are heated. Best growth results when a depression is required for condensing a condensed liquid. This may be achieved by merely tilting a substantially horizontal ampule.

The crystalline product shows the characteristics (magnetic, optical, magneto-optic, semiconducting, etc.) already attributed to the compositions. Crystal size, typically over three millimeters, is larger than that reported grown by any other method. Device uses include those dependent on the various characteristics noted and may be optimized by use of mixed compositions and by inclusions of certain additives. Such additions may be made by the inventive procedures. Claims are directed to such process variations and resulting product as well as to the general growth technique.

BRIEF DESCRIPTION OF THE DRAWING

The figure is a front elevational view of apparatus suitable for the practice of the inventive process.

DETAILED DESCRIPTION

(1) Included materials

The general class has already been indicated. Since $CdCr_2Se_4$ is the best known member of the class and has been widely investigated, this composition and also the procedure for its growth constitute a preferred embodiment of the invention. It has been indicated that compositional variations may be desired for certain purposes. All such variations may be produced in accordance with the invention. There is, of course, no limit on the relative amounts of any of the A ions or the sulfur or selenium ions in a mixed composition since all of the end structures are virtually identical. The desirability of producing such mixtures depends on the purpose for which the crystals are to be put. These include variations in Curie point or Néel temperature, changes in magnetic saturation ($4\pi M$) and changes (ordinarily broadening) in magnetic resonance linewidth and optical absorption.

It is observed that the desired structure is easily maintained with inclusion of 1% by weight total of various intended and unintended solutes (the term solutes here refers generally to inclusions and is not intended to differentiate between interstitial and substitutional additions). Solutes beneficially added include silver ($Ag_2S/Ag_2Se$)

indium ($In_2S_3/In_2Se_3$), nickel (Ni), copper ($CuCl_2$), gallium ($GaCl_3$, $Ga_2Se_3$) and gold (Au), for example, for the purpose of changing carrier concentration or to change conductivity type. The parenthetical notation after each solute indicates a convenient form in which it may be included with the starting ingredients.

Certain solutes broaden resonance linewidth and shift and/or increase absorption (usually in the infrared). Such solutes, examples of which are nickel (Ni) and cobalt (CoS/CoSe), may be considered desirable or undesirable depending on intended device use.

Partial replacement of chromium with a nonmagnetic ion results in a decrease in magnetic saturation and also results in a drop in the domain transition temperature (Curie point or Néel temperature). Examples are titanium ($TiCl_3$) and vanadium ($VCl_3$).

Divalent 4f rare earths have appropriate ionic radii to substitute in the A site for zinc, cadmium or cobalt. Such substitutions are of interest in optical devices where particular emission lines or absorption lines may be desired. Such elements are conveniently included as chlorides.

Unintentional inclusions, from the standpoint of growth, and production of the desired spinel structure may be tolerated to about one weight percent. A total solute content (intentional plus unintentional) of about 10 mol percent is generally indicated. In certain cases, even this limit may be exceeded, and, consequently, the inventive process is considered generally applicable provided the spinel structure results. Of course, depending on the ultimate device use, it may be desirable or necessary to impose a lower limit. From this standpoint, it may be desirable to maintain the level of inclusion having absorptions within a desired transparency band at a few parts per million. Other such considerations relative for example, to resonance linewidth, Curie Point, coercivity, magnetic saturation, carrier mobility, etc., are well known to those skilled in the pertinent device arts. Such considerations are no limitation on the present invention which is directed broadly to the growth of crystals of the described composition and structure.

(2) Detailed description of the figure

The apparatus depicted includes a vial 1 and a boat 2, the contents of the latter including a pellet of chromium chloride 3 and a pellet 4 of cadmium selenide or other sulfide or selenide of A, pellets 3 and 4 being separated by spacer 5. The relative position of the pellets is not critical. In use, vial 1, once evacuated, is sealed and is placed in a furnace not shown. During growth, vial 1 is inclined with its cooler end at an elevation lower than that of the portion containing boat 2. Vapor is condensed as liquid body 6, and crystals shown as 7 precipitate out of liquid body 6, generally at the lower or the lowest temperature region within the liquid.

(3) The growth method

(a) Starting materials

These have been generally described as to composition. It is convenient to use finely divided powders which are pressed together into pellets, although no such treatment is necessary. Purity of the starting materials is to be determined in accordance with the requisite purity of the final product. Certain solutes may be included in greater amount either by reason of lower vapor pressure or lack of effect on the final product for its intended device use.

Optimum growth appears to result at the approximate mol ratio of 2:1 for the ASe and/or A′S, and $CrCl_3$ ingredients in that order. Based on this experimental observation, it is postulated that the operative reaction is:

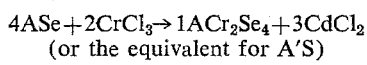

(or the equivalent for A′S)

Regardless of whether this assumption is founded, most effective growth conditions are found to lie within the mol range of from 5:1 to 1:2.5. The effect of exceeding either limit is to reduce yield of the desired spinel composition. These considerations are substantially unaffected by solute inclusions whether intentional or unintentional.

While not necessary, it has been found desirable to include platinum, particularly in the growth of $CdCr_2Se_4$, to suppress formation of $Cr_2Se_3$. Suppression, conveniently accomplished by inclusion of platinum as a power in an amount of up to about 10 weight percent based on chromium trichloride, is in accordance with a traditional Redox reaction. While it has been found convenient to use pressed powder pellets of the essential initial ingredients, other forms which permit separation and result in expedient vapor concentration are appropriate.

(b) Apparatus considerations

While it is generally required that the two classes of starting ingredients be separated to minimize interfacial reaction, the method used in accordance with the apparatus depicted should be considered exemplary only. Alternative measures include use of separate boats and even use of separate vaporizing sections which may, in turn, use separate heating means. Such alternative measures may use in-line placement as well as V tubes and Y tubes.

Since growth requires the collection of a condensed liquid from which crystalline product precipitates, the geometry must be designed accordingly. This may be accomplished merely by inclining an otherwise horizontal tube in accordance with the figure or by providing a deliberate depression. As will be seen, the position of liquid collection should be such as to permit a temperature gradient of at least 20° C. It is not, however, a requirement that collection occur at the minimum temperature end of the gradient.

The furnace must, of course, be one of sufficient size to permit the appropriate separation of starting material position and crystal growth position. A minimum separation of about ½ inch is generally indicated. The furnace must, of course, be one capable of providing the desired temperature gradient in the available spacing.

(c) Procedure

In this section, the general growth procedure is outlined. Optimum parameters as well as permissible parameter ranges are set forth.

The starting materials are loaded into the vial and the vial is evacuated. Atmosphere is not critical, and it is not necessary to flush before evacuating. The purpose of evacuation is to avoid oxidation of the starting materials, and, to this end, a room temperature pressure of $10^{-1}$ torr conveniently reached by mechanical means is adequate. The examples were conducted at pressures of the order of $10^{-4}$ torr. The vial is next sealed and placed in a furnace.

The temperature of the vial is raised to the desired level, ordinarily at the normal heating rate for the furnace. In the examples, it took about 2 hours to attain temperature. Other rates are permissible as limited largely by apparatus considerations.

The minimum temperature at the position of the starting ingredients is about 800° C. since expedient transport rates do not result at significantly lower temperatures. A preferred minimum temperature of 850° C. is indicated for optimization of transport rate. The maximum temperature is normally limited by apparatus considerations. For example, where the vial is made of silica (fused quartz), the softening point of about 1200° C. for that material results in such a maximum. Since $CrCl_3$ has the higher vapor pressure of the two starting ingredients, where there is substantial separation between such ingredients, ASe and/or A′S may be maintained at a temperature lower than that of $CrCl_3$. In such event, both starting ingredient temperatures should be maintained at least 20° C. above that of the crystal growth position to avoid formation of the spinel on the starting ingredient/ingredients.

It has been indicated that a temperature gradient of at least 20° C. is required. This is necessitated by the desire to separate product from reactants. A maximum temperature gradient of about 100° C. assures reasonably slow growth rates required for large crystalline dimensions.

This maximum value is not absolute and may be exceeded, particularly for large spacings between reactant and product and, particularly, where large crystals are not required. Growth temperatures may be maintained to exhaustion of reactants or such lesser time as assures desired growth. Times in the examples were of the order of 50 hours or more.

Vial and contents are next cooled, conveniently at the cooling rate of the furnace, and, in any event, not so rapidly as to result in thermal shock, after which the crystalline product is removed from the now solidified condensate by leaching in water and/or dilute aqueous mineral acid solution (.1NHCl was used in some of the examples).

(4) Examples

The following examples were all run in apparatus of the type depicted and in accordance with the general procedure outlined above.

Example 1

$CdCr_2S_4$ was grown from 23.08 grams (.16 mol), CdS and 12.68 grams (.08 mol) $CrCl_3$. 1.00 gram platinum powder was included to suppress formation of $Cr_2S_3$. Initial ingredients were maintained at a temperature of 980° C. and a temperature gradient of about 80° C. was maintained between reactant and condensate region, the latter defined by the end of a straight tube inclined at an angle of about 15° to the horizontal. Crystals about 5 mm. in major dimension resulted in a growth period of 113 hours.

Example 2

$CdCr_2Se_4$ was grown from 7.65 grams (.04 mol), CdSe and 3.17 grams (.02 mol) $CrCl_3$. 0.40 gram of platinum was included to suppress the formation of $Cr_2Se_3$. Reactants were maintained at 850° C., the temperature gradient was about 50° C and growth was terminated after about 71 hours. Crystal size was about 4 mm.

Example 3

$ZnCr_2S_4$ was grown from 3.90 grams (.04 mol), ZnS and 317 grams (.02 mol) $CrCl_3$. Reactants were maintained at 935° C. The gradient of 55° C. growth was terminated after 73 hours. Crystal size was 2 mm.

Example 4

$ZnCr_2Se_4$ growth from 34.62 grams (.24 mol), ZnSe and 19.02 grams (.12 mol) $CrCl_3$. Reactants were maintained at 955° C. The gradient was about 55° C. The growth period of 113 hours resulted in crystals of the order of 8 mm.

Example 5

$CoCr_2S_4$ was grown from 3.64 grams (.04 mol), CoS and 3.17 grams (.02 mol) $CrCl_3$. 0.40 gram of platinum was included to suppress formation of $Cr_2S_3$. Reactants were maintained at 900° C. The temperature gradient was 50° C. and growth time was 90 hours. Crystals of the order of 3 mm. resulted.

The above examples represent a small part of a number of the runs. Others include such variations in reactant mol ratios, temperatures, and times as were required to set the parameter ranges which have been set forth. A number of additional runs support the statement that compositional variations such as inclusion of solutes may result in the spinel structure. Expedient form in which such additions may be made has been indicated. All compositions have been identified both as to indicated stoichiometry and spinel structure. Characteristics of device interest have been found to be those already associated with the various materials.

The invention has been described in terms of a limited number of embodiments. The invention is premised broadly on the finding that growth may proceed through the vapor and liquid phases with the reactant materials at temperatures of 800° C. and higher under conditions as otherwise noted. It is clear that this finding may indicate the suitability of alternative growth conditions. It is apparent, for example, that maintenance of the appropriate vapor overpressure may permit recrystallization within a liquid of the composition otherwise corresponding with the liquid condensate.

We claim:

1. Method for crystallizing a composition of the spinel structure which consists essentially of at least one composition selected from the group consisting of $ACr_2Se_4$ and $A'Sr_2S_4$ where A is at least one element selected from the group consisting of zinc and cadmium and A' is at least one element selected from the group consisting of zinc, cadmium, cobalt, manganese, iron, copper and nickel from initial ingredients which include $CrCl_3$ and at least one compound selected from the group consisting of ASe and A'S, where A and A' are as above defined, characterized in that said stated initial ingredients are separated, in that said initial ingredients are vaporized at a first temperature of at least 800°C. and in that a liquid condensate is collected at a second temperature at least 20° C. cooler than said first temperature so that crystalline product of the said composition precipitates within said condensate.

2. Method in accordance with claim 1 in which said second temperature is a maximum of 100° C. cooler than said first temperature.

3. Method in accordance with claim 2 in which said composition consists essentially of at least 90 mol percent $CdCr_2Se_4$, in which platinum is maintained in contact with at least one of the said initial ingredients.

4. Method of claim 1 in which the condensate and initial ingredients are separated by at least ½ inch.

5. Method of claim 2 in which the initial ingredients are maintained at a temperature of at least 850° C.

6. Method of claim 1 in which the mol ratio of the stated initial ingredients is from 5:1 to 1:2.5, this being the ratio of at least one compound selected from the group consisting of ASe and A'S to $CrCl_3$.

References Cited

UNITED STATES PATENTS 3,480,409  11/1969  Dillon et al. _____ 23—294

NORMAN YUDKOFF, Primary Examiner

S. SILVERBERG, Assistant Examiner

U.S. Cl. X.R.

23—315